United States Patent
Ortet et al.

(10) Patent No.: US 10,862,396 B2
(45) Date of Patent: Dec. 8, 2020

(54) SWITCHED-MODE POWER SUPPLY HAVING MULTIPLE OPERATING PHASES

(71) Applicant: STMicroelectronics (Rousset) SAS, Rousset (FR)

(72) Inventors: Sebastien Ortet, Beaurecueil (FR); Didier Davino, Pourrieres (FR); Cedric Thomas, Aix-en-Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 16/599,450

(22) Filed: Oct. 11, 2019

(65) Prior Publication Data

US 2020/0119644 A1 Apr. 16, 2020

(30) Foreign Application Priority Data

Oct. 15, 2018 (FR) ...................... 18 59528

(51) Int. Cl.
*H02M 3/158* (2006.01)
*H02M 1/36* (2007.01)

(52) U.S. Cl.
CPC ............. *H02M 3/158* (2013.01); *H02M 1/36* (2013.01)

(58) Field of Classification Search
None
See application file for complete search history.

(56) References Cited

U.S. PATENT DOCUMENTS

| 2007/0182397 | A1 | 8/2007 | Deguchi | |
|---|---|---|---|---|
| 2008/0101102 | A1 | 5/2008 | Lipcsei et al. | |
| 2012/0242308 | A1* | 9/2012 | Adeeb | H02M 3/156 323/274 |
| 2013/0249524 | A1* | 9/2013 | Kujala | H02M 3/156 323/312 |
| 2015/0123631 | A1* | 5/2015 | Hang | H02M 1/32 323/271 |
| 2015/0381044 | A1* | 12/2015 | Bodano | H02M 3/1588 323/271 |
| 2018/0323696 | A1* | 11/2018 | Gammie | H03K 17/0822 |

OTHER PUBLICATIONS

INPI Search Report and Written Opinion for FR 1859528 dated Jun. 20, 2019 (11 pages).

* cited by examiner

*Primary Examiner* — Jeffrey A Gblende
(74) *Attorney, Agent, or Firm* — Crowe & Dunlevy (57) ABSTRACT

An electronic device includes a switched-mode power supply having a first operating phase during which the output node of the switched-mode power supply is coupled by an on switch to a source of a first reference voltage. The first operating phase is followed by a second operation phase during which the output node of the switched-mode power supply is in a high impedance state. While in the second operating phase, a capacitor connected to the output node of the switched-mode power supply at least partially discharges into a load.

19 Claims, 7 Drawing Sheets

SWITCHED-MODE POWER SUPPLY HAVING MULTIPLE OPERATING PHASES

PRIORITY CLAIM

This application claims the priority benefit of French Application for Patent No. 1859528, filed on Oct. 15, 2018, the content of which is hereby incorporated by reference in its entirety to the maximum extent allowable by law.

TECHNICAL FIELD

The present disclosure generally concerns switched mode power supplies and their operating modes.

BACKGROUND

Switched-mode power supplies are DC/DC converters which incorporate one or a plurality of switches. Like the other types of power supplies, switched-mode power supplies transfer a power supplied by a source DC to a load, and in doing so, modify one of the current or voltage characteristics.

SUMMARY

An embodiment provides an electronic device comprising a switched-mode power supply, having a first operating phase during which the output node of the switched-mode power supply is coupled by an on switch to a source of a first voltage, followed by a second operating phase during which the output node of the power supply is in a state of high impedance so that a capacitor connected to the output node of the switched-mode power supply at least partially discharges into a load.

An embodiment provides a method of controlling an electronic device comprising a switched-mode power supply, having a first operating phase during which the output node of the switched-mode power supply is coupled by an on switch to a source of a first voltage, followed by a second operating phase during which the output node of the power supply is in a high impedance state so that a capacitor connected to the output node of the switched-mode power supply at least partly discharges into a load.

According to an embodiment, a first circuit is capable of comparing the voltage of the output node with a second voltage.

According to an embodiment, the first circuit supplies a signal causing the setting of the output node of the switched-mode power supply to the high impedance state.

According to an embodiment, the second voltage passes from a high value to a low value on passing from the first to the second operating phase.

According to an embodiment, the capacitance is connected between the output node and a ground, the output node being coupled to a second node by an inductance.

According to an embodiment, the switched-mode power supply comprises two transistors, series-connected between a source of the first voltage and the source of a third voltage, the junction point of the two transistors being the second node.

Another embodiment provides an electronic device comprising a switched-mode power supply, wherein if the output voltage is greater than a first voltage, then an output node of the switched-mode power supply is set to a high impedance state and a first capacitor connected to the output node of the switched-mode power supply at least partly discharges into a load.

Another embodiment provides a method of controlling an electronic device comprising a switched-mode power supply, wherein if the output voltage is greater than a first voltage, then an output node of the switched-mode power supply is set to a high impedance state and a first capacitor connected to the output node of switched-mode power supply at least partly discharges into a load.

According to an embodiment, if the output voltage is smaller than the first voltage, then the switched-mode power supply is started.

According to an embodiment, the device or the method has an operating phase during which the output node is coupled to a source of a second voltage by a first switch.

According to an embodiment, the switched-mode power supply comprises a comparator, coupled at its input to a source of the first voltage and to a first node; a second capacitor coupled between the first node and the ground; a current source coupled to the first node by a second switch; and a third switch coupled between the first node and the output node of the switched-mode power supply.

According to an embodiment, the switched-mode power supply comprises a fourth switch coupled between the source of the first voltage and the first node.

According to an embodiment, the third switch is on and the second capacitor is charged until the voltage thereacross is the voltage of the output node.

According to an embodiment, after the charge of the second capacitor, if the output voltage is smaller than the first voltage, then the third switch is turned off and the second switch is turned on until the voltage of the first node is the voltage, the second switch then being turned off and the fourth switch being turned on.

According to an embodiment, after the charge of the second capacitor, if the output voltage is greater than the first voltage, then the fourth switch is turned on and the third switch is turned off.

According to an embodiment, the switched-mode power supply comprises a state machine.

Another embodiment provides an electronic device comprising a switched-mode power supply having an operating phase during which an output node is in a high impedance state while a reference voltage passes from a first high value to a first low value.

Another embodiment provides a method of controlling an electronic device comprising a switched-mode power supply having an operating phase during which an output node is in a high impedance state while a reference voltage passes from a first high value to a first low value.

According to an embodiment, the device or the method comprises an operating phase during which the reference voltage increases stepwise from a second low value to a second high value.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more intermediate elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "substantially", and "approximately" are used herein to designate a tolerance of plus or minus 10%, preferably of plus or minus 5%, of the value in question.

Figure 1:
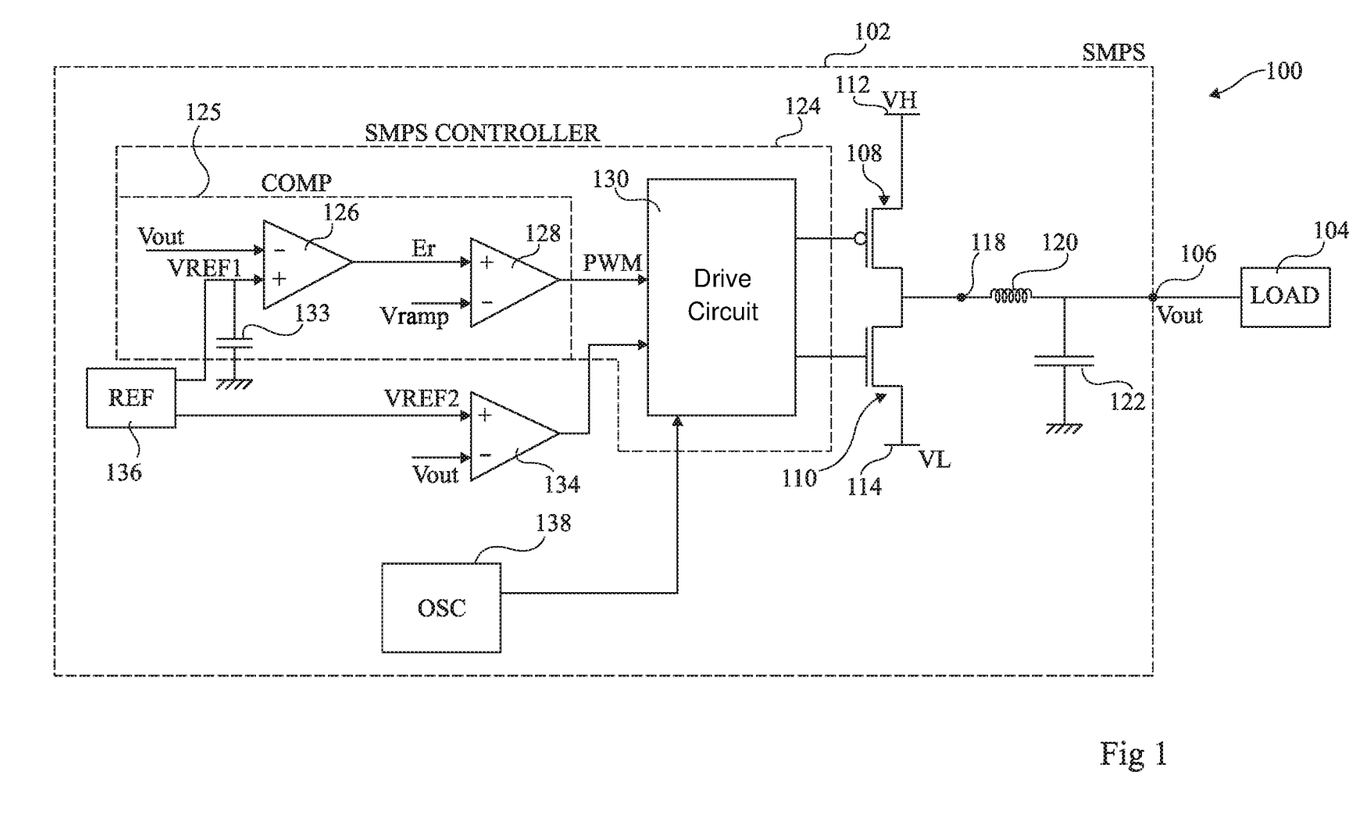
FIG. 1 shows an embodiment of an electronic circuit comprising a switched-mode power supply.

FIG. 1 shows an embodiment of an electronic circuit 100 comprising a switched-mode power supply 102 (SMPS). The switched-mode power supply may operate in various operating modes, for example, a normal mode, a so-called "bypass" mode, etc.

The switched-mode power supply powers a load 104 (LOAD). More particularly, load 104 is coupled, for example, connected, to an output node 106 of switched-mode power supply 102 having a voltage Vout applied thereto.

Switched-mode power supply 102 comprises two switches, for example, transistors 108 and 110, series-coupled between a source 112 of a high reference voltage VH and a source 114 of a low reference voltage VL, for example, the ground. Transistor 108 is, for example, a PMOS transistor coupled, preferably connected, by its source and its drain between source 112 and a node 118. Transistor 110 is, for example, an NMOS transistor coupled, preferably connected, by its source and its drain, between source 114 and node 118. Node 118 is coupled to output node 106 via an inductor 120. Output node 106 is coupled to ground via a capacitor 122.

Transistors 108 and 110 are controlled by a control circuit 124 (SMPS CONTROLLER). Control circuit 124 comprises a comparison circuit 125 (COMP). Circuit 125 comprises a comparator 126, for example, an error amplifier. Comparator 126 receives as an input a reference voltage VREF1, smaller than voltage VH, and voltage Vout. The output of comparator 116 delivers an error signal Er, representative of the voltage difference between reference voltage VREF1 and voltage Vout. The input of comparator 126 receiving reference voltage VREF1 is further coupled to ground by a capacitor 133.

Comparison circuit 125 further comprises a comparator 128 receiving as inputs the signal Er and a periodic sawtooth signal Vramp. Comparator 128 outputs a pulse-width modulated signal PWM. Signal PWM is a periodic binary signal comprising a high state and a low state. The duty cycle of signal PWM is controlled by signal Er. Thus, the more significant the difference between reference voltage VREF1 and the feedback voltage, that is, the greater the error signal Er, the more significant the duty cycle of signal PWM.

Control circuit 124 further comprises a drive circuit 130 for generating the control signals of transistors 108 and 110. More particularly, when signal PWM is in the high state, circuit 130 turns on switch 108 and turns off switch 110 and when signal PWM is in the low state, circuit 130 turns off switch 108 and turns on switch 110.

Switched-mode power supply 102 further comprises another comparator 134 receiving as an input another reference voltage VREF2 and output voltage Vout. Reference voltage VREF2 preferably corresponds to a voltage similar to voltage VREF1 having faster variations. The output of comparator 134 is supplied to generation circuit 130. Reference voltages VREF1 and VREF2 are supplied by a reference voltage generation circuit 136 (REF).

Switched-mode power supply 102 further comprises an oscillator 138 having its output connected to drive circuit 130.

Figure 2:
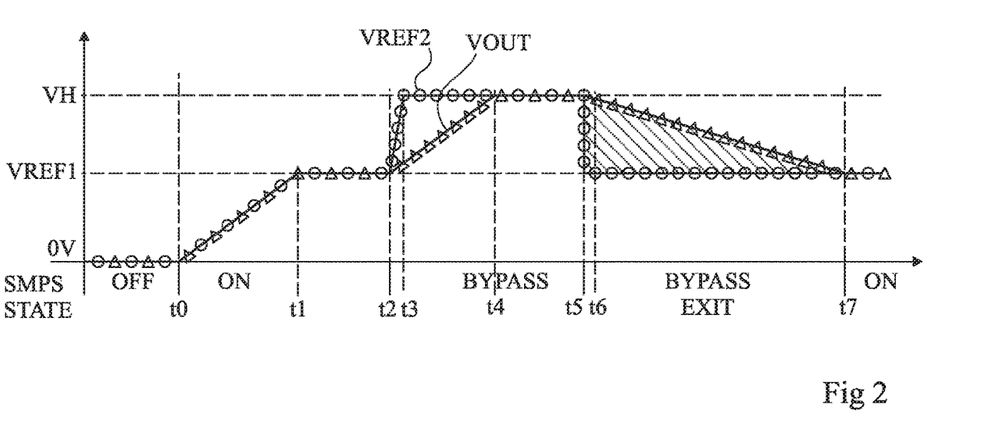
FIG. 2 shows variations of signals of the device of FIG. 1.

FIG. 2 shows time variations of signals of the device of FIG. 1 and illustrates steps of the operation of switched-mode power supply 102. More particularly, FIG. 2 illustrates output voltage Vout (triangle), reference voltage VREF2 (round), and the state of power supply 102 (SMPS STATE).

Before a time t0, power supply 102 is off (OFF), voltages Vout and VREF2 are thus zero. At time t0, power supply 102 is started in a normal operating mode (ON), that is, an operating mode where switches 108 and 110 alternately turn off and on, controlled by circuit 130. Capacitor 122 then charges up to a time t1 when voltage Vout becomes equal to voltage value VREF1 and is maintained at this value. During this phase of operation in the normal mode, voltage VREF2 has substantially the same value as voltage Vout.

At a time T2, power supply 102 enters a so-called "bypass" mode (BYPASS), during which switch 108 is maintained on and switch 110 is maintained off. During this operating phase, output node 102 of the switched-mode power supply thus directly and continuously receives the power supplied by source 112. Thus, voltage Vout increase until a time t4 at which it reaches value VH.

Voltage VREF2 increases from time t2 to reach value VH at a time t3, between t2 and t4.

Oscillator 138 is off during the bypass mode.

At a time T5, power supply 102 enters a transient bypass mode exit phase (BYPASS EXIT). During this transient phase, oscillator 138 is powered back on, to prepare the return of the normal operating mode. Voltage VREF2 decreases to reach, at a time t6, the value of VREF1. The duration between t5 and t6 is, for example, shorter than 2 clock cycles.

At time t5, switch 108 is turned off. Thus, switches 108 and 110 are both off and output node 106 is in a high impedance state. During this operating phase, capacitor 122 thus discharges into load 104 to become equal to VREF2 at a time t7. This is determined by comparator 134. The output of comparator 134 then controls circuit 130 to enter the normal operating mode.

Another solution to decrease the voltage across capacitor 122, and thus the output voltage of the power supply, at the exit of the bypass mode would have been to discharge the capacitor into ground via switch 110. However, the discharged power would then be lost.

An advantage of the embodiment of FIGS. 1 and 2 is thus that the power of capacitor 122 is used and it thus not lost.

Figure 3:
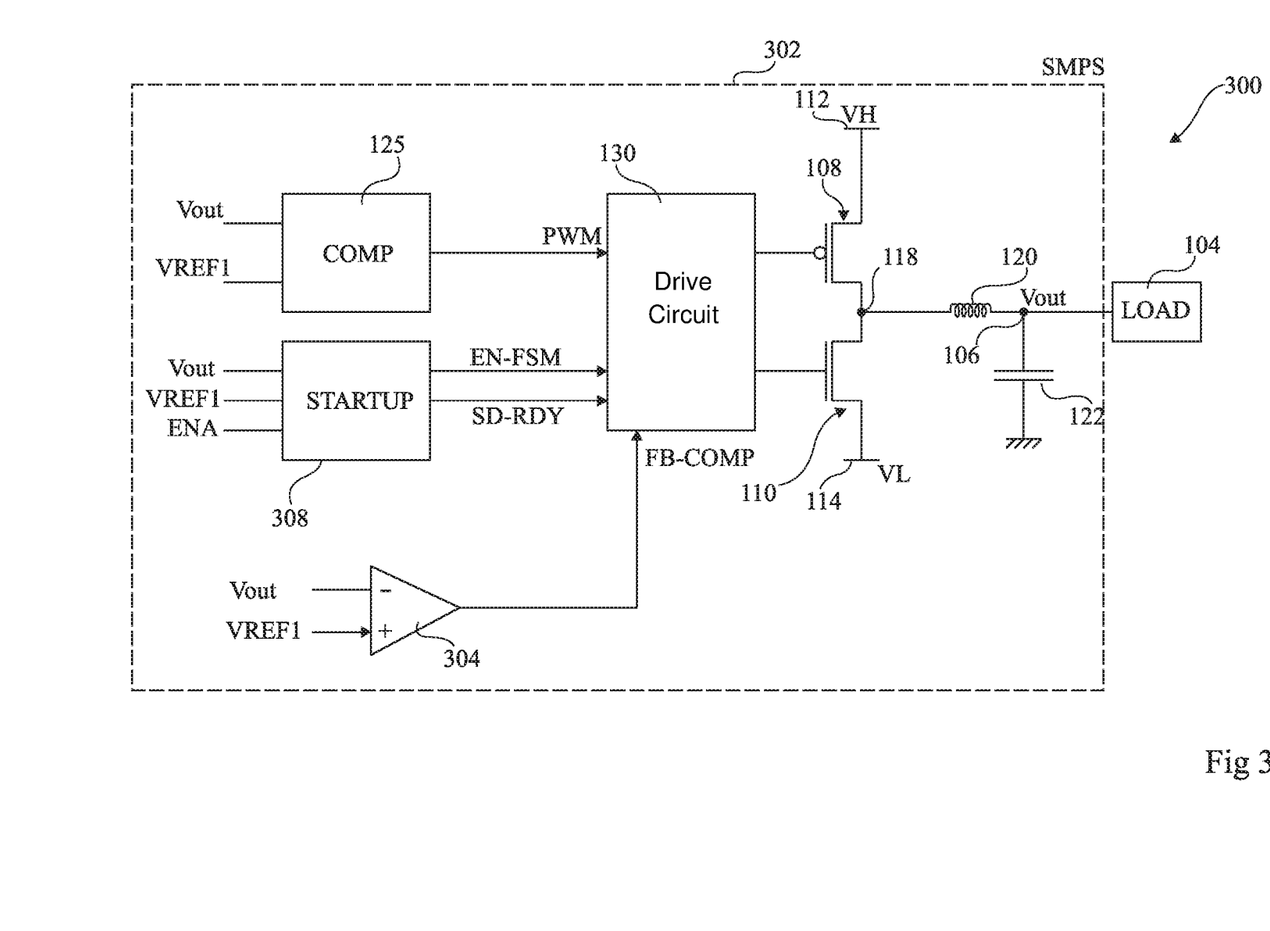
FIG. 3 shows another embodiment of an electronic circuit comprising a switched-mode power supply.

FIG. 3 shows another embodiment of an electronic circuit 300 comprising a switched-mode power supply 302 (SMPS). Circuit 300 comprises elements similar to elements of circuit 100 of FIG. 1 and preferably coupled together in the same way. These elements will be designated with the same reference numerals and will not be detailed again. In particular, electronic circuit 300 comprises: load 104; capacitor 122; inductance 120; switches 108 and 110; control signal generation circuit 130; and comparison circuit 125.

Figure 4:
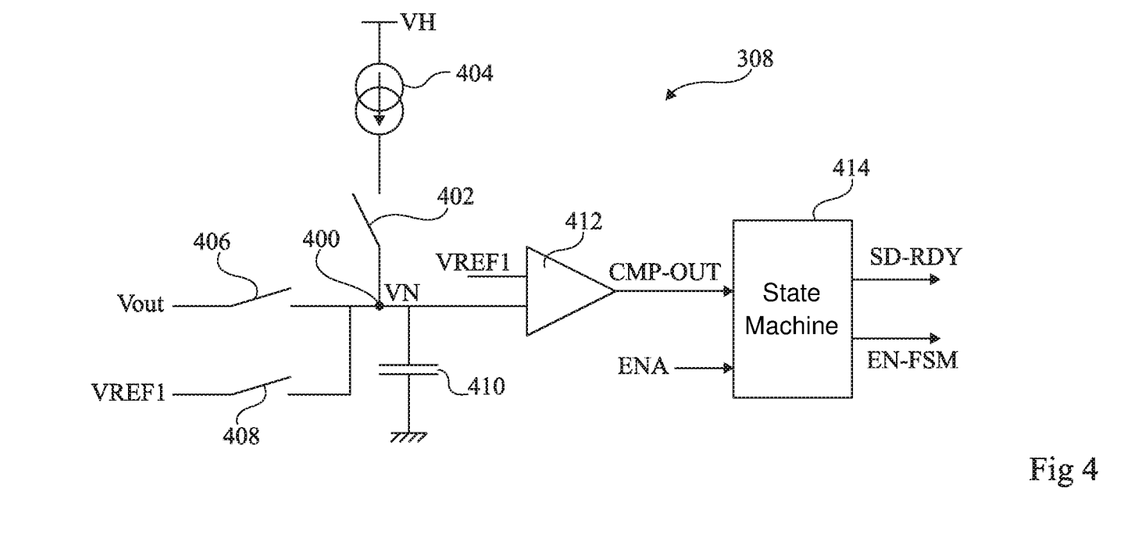
FIG. 4 shows in further detail a portion of the electronic device of FIG. 3.

Switched-mode power supply 302 further comprises a startup circuit 308 (STARTUP) receiving, at its input, output voltage Vout, reference voltage VREF1, and a control signal ENA. Startup circuit 308 supplies circuit 130 with a signal EN-FSM and a signal SD-RDY. Signal ENA is an enable signal authorizing the operation of switched-mode power supply 302. Signal EN-FSM enables to prepare the power supply, for example, the powering-on of the oscillator. Signal SD-RDY notifies circuit 130 that is it possible to power load 104. An example of such a circuit is shown in FIG. 4.

Switched-mode power supply 302 further comprises a comparator 304. Comparator 304 compares output voltage Vout and reference VREF1 and delivers a signal FB-COMP, representative of this comparison, to circuit 130.

When power supply 302 is off, capacitor 122 may discharge or charge, for example, with leakage currents. Thus, when the power supply is turned back on, the voltage across capacitor 122, and thus the output voltage of the switched-mode power supply, are unknown. In particular, whether output voltage Vout is greater or smaller than VREF1 is not known. Startup circuit 308 enables to determine whether capacitor 122 should be charged or discharged to reach voltage VREF1 and enables to determine the time at which power supply 302 may power the load.

Figure 5:
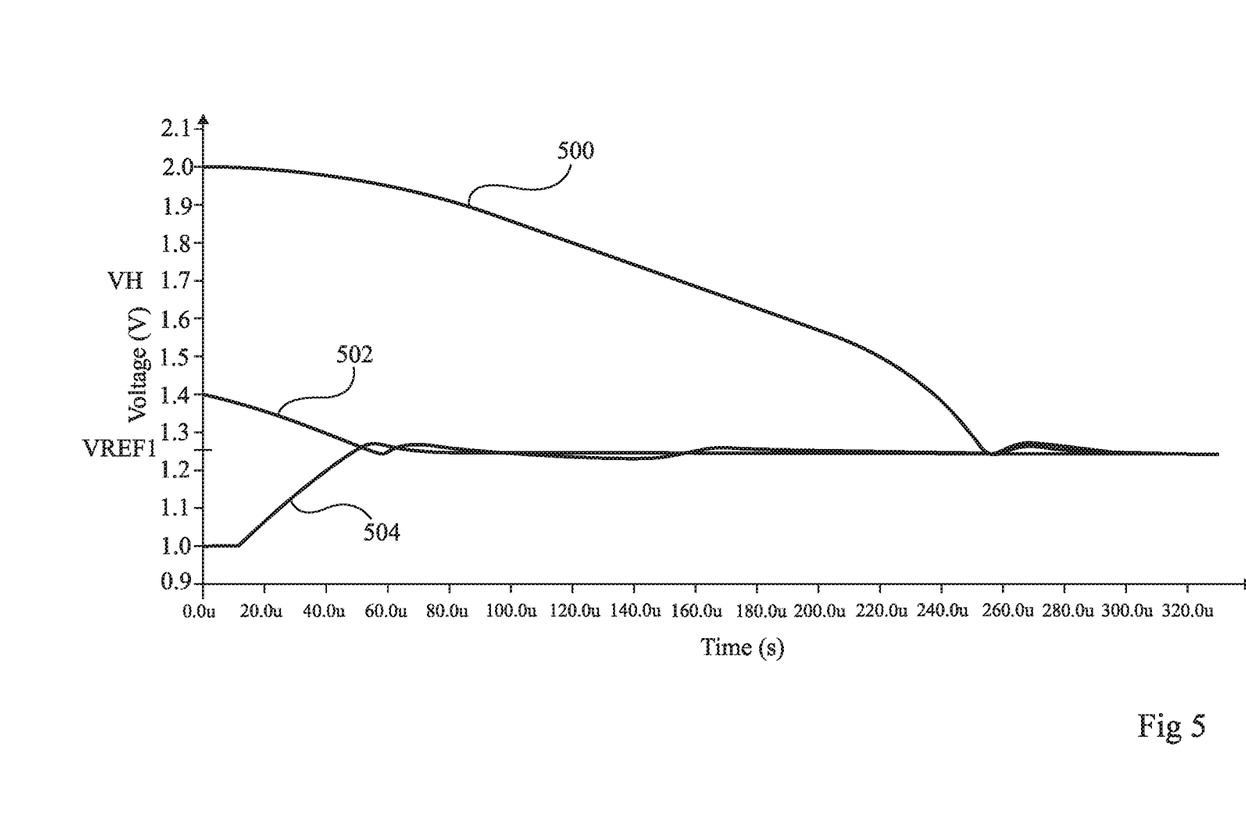
FIG. 5 shows examples of variations of a voltage of the electronic device of FIGS. 3 and 4.

The operation of the embodiment of FIG. 3 will be described in further detail in relation with FIGS. 4 and 5. FIG. 4 shows in further detail a portion of electronic device 300 of FIG. 3. More particularly, FIG. 4 shows an example of a startup circuit 308. FIG. 5 shows three curves 500, 502, and 504, each corresponding to an example of time variation of voltage Vout.

Circuit 308 comprises a main node 400 (voltage VN). Node 400 is coupled to a source of a reference or power supply voltage, for example, voltage VH, by a switch 402 in series with a current source 404. More particularly, the current source is coupled to node 400 via a switch 402. Node 400 is further coupled by a switch 406 to the input having output voltage Vout applied thereto, and by a switch 408 to the input having reference voltage VREF1 applied thereto. Node 400 is also coupled to ground via a capacitor 410.

Capacitor 410 is, for example, smaller than capacitor 122 (FIG. 3).

Node 400 is connected to an input of a comparator 412, the other input receiving voltage VREF1. Comparator 412 supplies signal CMP-OUT to a state machine 414. Signal CMP OUT is representative of the comparison between voltage VN and voltage VREF1. The state machine 414 further receives signal ENA and outputs signals SD-DRY and EN-FSM of circuit 308. Further, the state machine 414 controls switches 402, 406, and 408.

When signal ENA is zero, the switched-mode power supply is off, and circuit 130, on order of state machine 414, ascertains that output node 106 of power supply 300 is in a high impedance state. The value of voltage Vout is unknown.

On restarting of the switched-mode power supply, signal ENA is equal to 1 and a startup step is executed, during which voltage Vout is taken to value VREF1.

During this startup step, switch 406 is on and switches 402 and 408 are off. Thus, the voltage at node 400, that is, the voltage across capacitor 410, then becomes equal to voltage Vout. Simultaneously, comparator 412 is turned on. When comparator 412 is ready to operate, the comparator determines whether voltage VN on node 400 is greater or smaller than voltage VREF1 and supplies this information to the state machine by signal CMP-OUT.

If voltage VN is smaller than voltage VREF1 (curve 504, FIG. 5), then switch 402 is turned on and switch 406 is turned off, switch 408 remaining off. Capacitor 410 is thus charged up to voltage VREF1 using current source 404. Simultaneously, state machine 414 orders circuit 130 (FIG. 3) to start the switched-mode power supply in normal operation (EN–FSM=1), for example, by turning on an oscillator. The switched mode power supply no longer waits for the permission to power the load via signal SD-RDY.

When voltage VN reaches voltage VREF1, comparator 412 delivers this information to state machine 414 (signal CMP OUT). State machine 414 ensures the turning off of switch 402 and the turning on of switch 408. Capacitor 410 is, in this configuration, used to supply voltage VREF1.

Further, state machine 414 ensures that switch 108 is on and that switch 110 is off to charge capacitor 122. When voltage Vout reaches voltage VREF1, comparator 304 delivers this information to circuit 130. The switched-mode power supply may then enter an operating mode selected by the user, for example, in bypass mode, or in normal mode.

If voltage VN is greater that voltage VREF1 (curves 500 and 502, FIG. 5), then signal SD-RDY immediately takes value 1, that is, the load may be powered. Output node 106 is set to a high impedance state. Thus, capacitor 122 is discharged little by little into load 104, in order to power it. Further, switch 406 is turned off and switch 408 is turned on.

Signal EN-FSM takes value 1, thus enabling the power supply to operate in normal mode, as soon as voltage Vout reaches value VREF1. This information is supplied by signal FB-COMP of comparator 304 (FIG. 3).

Another solution would have been to fully discharge capacitor 122 each time power supply 300 is turned off, for example, into ground, via switch 110. Thus, voltage Vout would be zero and known. However, this power would be lost.

Thus, an advantage is that the power used for voltage Vout to reach VREF1 at the starting of power supply 302 is, in the case where voltage Vout is greater than voltage VREF1, zero and, in the case where voltage Vout is smaller than voltage VREF1, a power lower than that allowing the full charge of capacitor 122.

Figure 6:
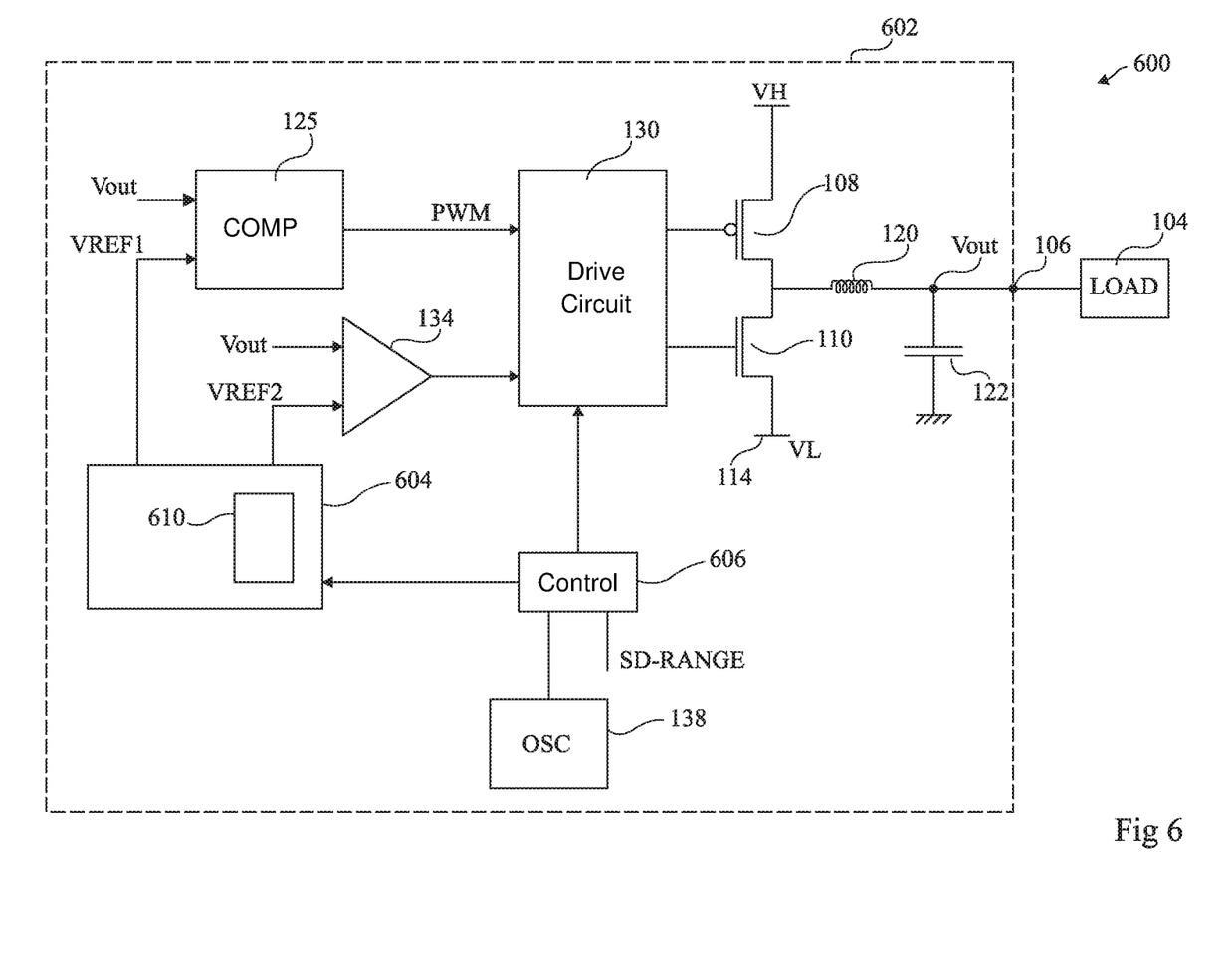
FIG. 6 shows another embodiment of an electronic circuit comprising a switched-mode power supply.

FIG. 6 shows another embodiment of an electronic circuit 600 comprising a switched-mode power supply 602. Circuit 600 comprises elements similar to elements of circuit 100 of FIG. 1 and/or of circuit 300 of FIG. 3, preferably coupled in the same way. These elements will be designated with the same reference numerals and will not be detailed again. In particular, electronic circuit 600 comprises: load 104;

capacitor 122; inductance 120; switches 108 and 110; control signal generation circuit 130; comparison circuit 125; oscillator 138; and comparator 134.

Power supply 602 further comprises a circuit 604 for generating reference signals VREF1 and VREF2. Power supply 602 comprises a circuit 606 supplying control signals to circuits 604 and 130.

Control circuit 606 is coupled to an input of oscillator 138 and to a node of application of a signal SD RANGE.

Circuit 604 is capable of supplying reference signals of different values, according to the control signal originating from circuit 606. For example, it is possible to vary reference voltage VREF2 between at least two predetermined values. For this purpose, circuit 604 comprises a circuit 610 having a variable resistance. For example, the resistance of circuit 610 may be selected between at least two predetermined values, each resistance value corresponding to a reference voltage value.

Figure 7:
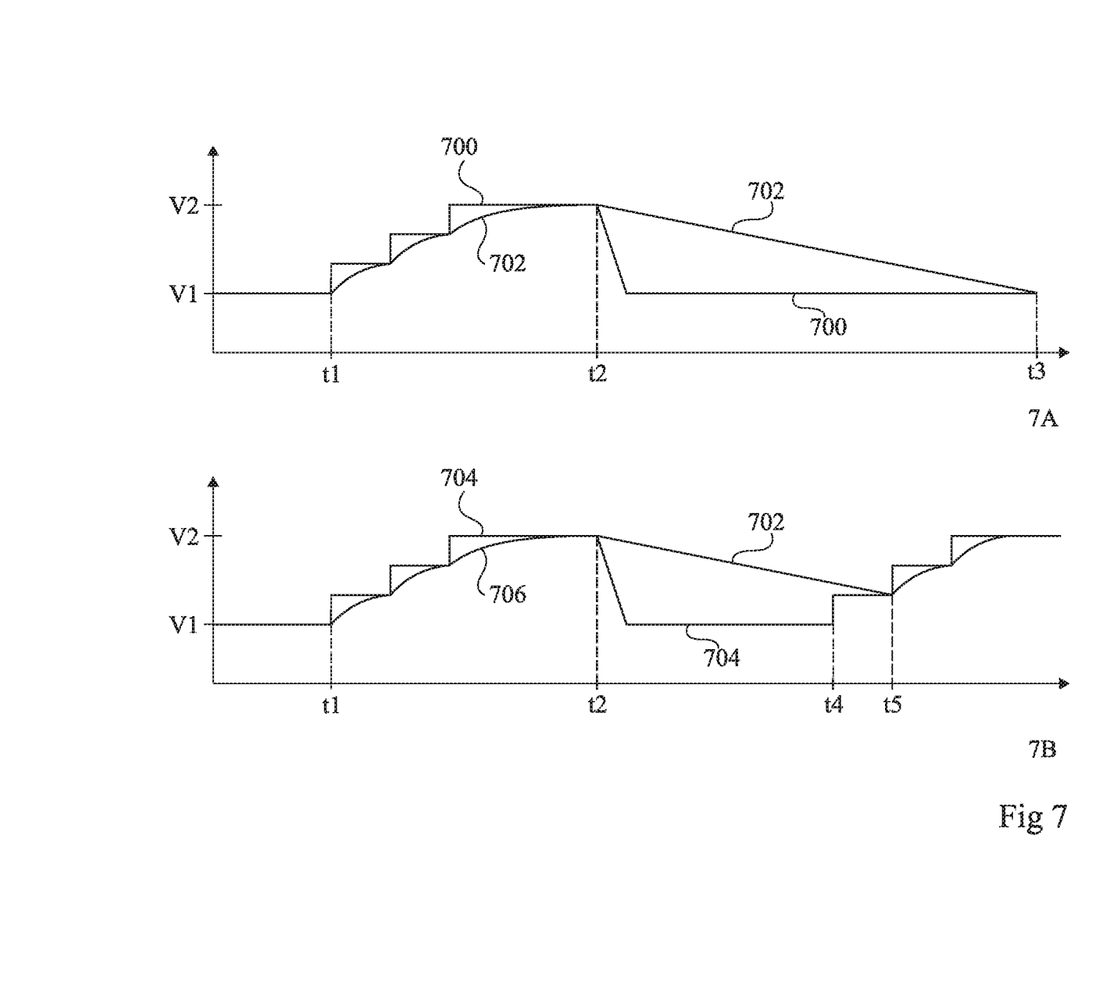
FIG. 7 shows examples of variations of the output voltage and of the reference voltage of the embodiment of FIG. 6.

FIG. 7 shows examples of variations of the output voltage and of the reference voltage of the embodiment of FIG. 6. More particularly, FIG. 7 comprises two timing diagrams 7A and 7B each illustrating the variation of output voltage Vout and reference voltage VREF2.

Timing diagram 7A comprises a curve 700 representing voltage VREF2 and a curve 702 representing voltage Vout. Voltage REF2 and Vout are initially at a low value V1. It is desired to increase the output voltage to a high value V2. To achieve this, at a time t1, voltage VREF2 is increased stepwise up to value V2, three steps being shown in FIG. 7. Such an increase is performed by modifying the resistance value of circuit 610 stepwise. Output voltage Vout also increases upon modification of the value of VREF2. For example, the duration of each step is selected so that output voltage Vout can reach the value of voltage VREF2 before voltage VREF2 passes to the next step.

At a time t2, circuit 604 receives the order to decrease voltage Vout down to value V1. Circuit 130 is then reset. During this reset, which for example lasts for two clock pulses, the output node is set to a high impedance state by circuit 606 and voltage VREF2 immediately takes the low value without steps.

Thus, voltage Vout decreases to reach V1 at a time t3. Switched-mode power supply 602 can then enter the normal operating mode, on order of comparator 134.

Timing diagram 7B comprises a curve 704 representing voltage VREF2 and a curve 706 representing voltage Vout.

The variations of curves 704 and 706 are identical to the variations of curves 700 and 702 until a time t4, between time t2 and time t3. Before time t4, voltage VREF2 is at value V1 and capacitor 122 is not finished discharging. At time t4, circuit 604 is controlled by circuit 606 to increase again voltage Vout up to value V2. Voltage VREF2 thus increases stepwise.

At a time t5, comparator 134 determines that voltage Vout is equal to voltage VREF2. Output node 106 leaves the high impedance state and voltage Vout increases again in accordance with the reference voltage.

Thus, capacitor 122 has not fully discharged and the charge is less power-consuming.

It could have been chosen to decrease the value of voltage VREF2 stepwise, in the same way as the value of voltage VREF2 has been increased. However, capacitor 122 would then discharge into ground via inductance 120, and the power of capacitor 122 would be lost.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereabove.

Finally, the practical implementation of the described embodiments and variations is within the abilities of those skilled in the art based on the functional indications given hereabove. In particular, the embodiment described in relation with FIGS. 1 and 2, the embodiment described in relation with FIGS. 3, 4 and 5 and the embodiment described in relation with FIGS. 6 and 7 can be combined in pairs or all three together.

In particular, the embodiment described in relation with FIGS. 1 and 2, and the embodiment described in relation with FIGS. 3, 4 and 5, can be combined. The circuit of FIG. 3 can comprise the comparator 134, as described in relation with FIG. 1, receiving as inputs the voltage Vout and the voltage VREF2. The operation of the circuit combining the embodiments of FIGS. 1 to 5 is, during the starting of the circuit, the operation described in relation with FIGS. 3, 4 and 5. The operation of the circuit combining the embodiments of FIGS. 1 to 5 is, during the exit of the bypass mode, the operation described in relation with FIGS. 1 and 2.

The embodiment described in relation with FIGS. 6 and 7, and the embodiment described in relation with FIGS. 3, 4 and 5, can be combined. The circuit of FIG. 3 can comprise the comparator 134, and the circuits 604 and 606, as they are described in relation with FIGS. 6 and 7. The operation of the circuit combining the embodiments of FIGS. 3 to 7 is, during the starting of the circuit, the operation described in relation with FIGS. 3, 4 and 5. The operation of the circuit combining the embodiments of FIGS. 3 to 7 is, after the starting, the behavior described in relation with FIGS. 6 and 7.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An electronic device, comprising:
 a switched-mode power supply having a first operating phase during which an output node of the switched-mode power supply is coupled to a source of a first voltage by a switch controlled in an on state, followed by a second operating phase during which the output node of the switched-mode power supply is controlled to be in a high impedance state;
 a first capacitor connected to the output node of the switched-mode power supply, wherein the capacitor is charged during the first operating phase and is at least partially discharged into a load during the second operating phase; and
 a first circuit, comprising:
   a comparator having inputs coupled to a source of a reference voltage and to a first node;
   a second capacitor coupled between the first node and the ground;
   a current source coupled to the first node by a first switch;
   a second switch coupled between the first node and the output node of the switched-mode power supply; and a third switch coupled between the source of the reference voltage and the first node.

2. The device of claim 1, further comprising a second circuit configured to compare the voltage of the output node with the reference voltage.

3. The device of claim 2, wherein the second circuit generates a signal in response to the comparison which causes the setting of the output node of the switched-mode power supply to the high impedance state.

4. The device of claim 2, wherein the reference voltage changes from a first value to a second value that is lower than the first value when operation changes from the first operating phase to the second operating phase.

5. The device of claim 1, wherein the first capacitor is connected between the output node and a ground, and further comprising an inductor coupling the output node to a second node.

6. The device claim 5, further comprising two transistors series connected between the source of the first voltage and a source of a third voltage, wherein a junction point between the two transistors is the second node, and wherein said first switch is one of said two transistors.

7. The device of claim 1, wherein the comparator is configured, in response to actuation of the second switch, to determine whether the output node of the switched-mode power supply is less than the first voltage and in response thereto enable operation of the switched-mode power supply.

8. The device of claim 7, wherein the first switch is then actuated to charge the second capacitor to the first voltage and the third switch is then actuated to supply the first voltage from the second capacitor as a reference voltage.

9. The device of claim 1, wherein the comparator is configured, in response to actuation of the second switch, to determine whether the output node of the switched-mode power supply is greater than the first voltage and in response thereto control setting of the output node of the switched-mode power supply to the high impedance state.

10. An electronic device, comprising:
a switched-mode power supply;
a first circuit configured to sense whether an output voltage of the switched-mode power supply is greater than a first voltage and in response thereto control a first switch to set an output node of the switched-mode power supply to a high impedance state and permit a first capacitor connected to the output node of the switched-mode power supply to at least partially discharge into a load; and
a second circuit, comprising:
a comparator having inputs coupled to a source of the first voltage and to a first node;
a second capacitor coupled between the first node and the ground;
a current source coupled to the first node by a second switch; and
a third switch coupled between the first node and the output node of the switched-mode power supply; and
a fourth switch coupled between the source of the first voltage and the first node.

11. The device of claim 10, wherein said first circuit is further configured to start the switched-mode power supply if the output voltage is smaller than the first voltage.

12. The device of claim 10, wherein the first circuit is further configured to couple the output node to a source of a second voltage through said first switch.

13. The device claim 10, wherein the third switch is on and the second capacitor is charged until the voltage across the second capacitor is the voltage of the output node.

14. The device claim 13, wherein, after charging the second capacitor, if the output voltage is smaller than the first voltage, then the third switch is turned off and the second switch is turned on until the voltage of the first node is the first voltage, the second switch then being turned off and the fourth switch then being turned on.

15. The device of claim 13, wherein, after charging the second capacitor, if the output voltage is greater than the first voltage, then the fourth switch is turned on and the third switch is turned off.

16. The device of claim 10, wherein the switched-mode power supply comprises a state machine.

17. The device of claim 10, wherein the comparator is configured, in response to actuation of the third switch, to determine whether the output node of the switched-mode power supply is less than the first voltage and in response thereto enable operation of the switched-mode power supply.

18. The device of claim 17, wherein the second switch is then actuated to charge the second capacitor to the first voltage and the fourth switch is then actuated to supply the first voltage from the second capacitor as a reference voltage.

19. The device of claim 10, wherein the comparator is configured, in response to actuation of the third switch, to determine whether the output node of the switched-mode power supply is greater than the first voltage and in response thereto control setting of the output node of the switched-mode power supply to the high impedance state.

* * * * *